Figure 7:
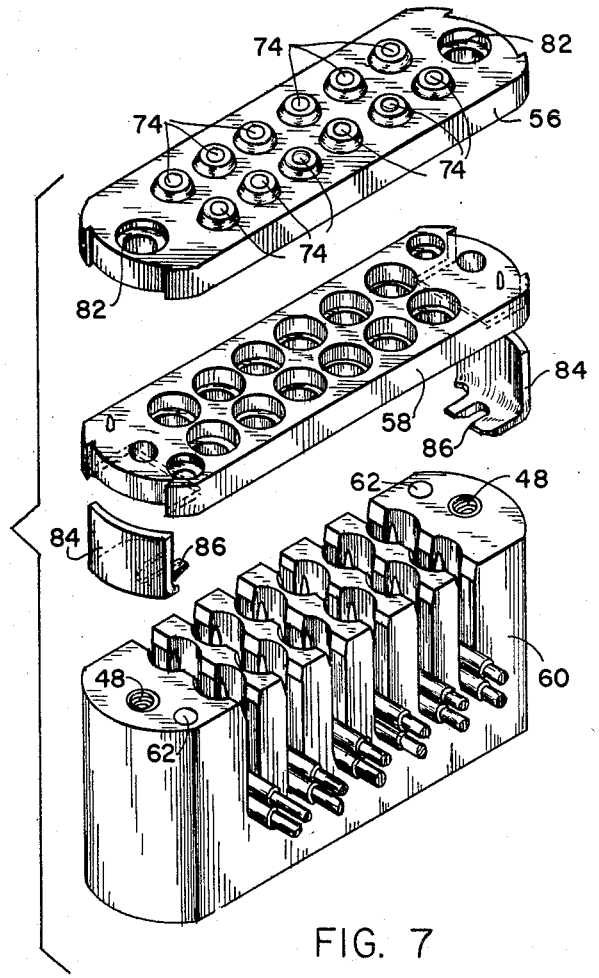

April 6, 1965 S. N. BUCHANAN 3,177,458
CONNECTOR SYSTEM AND METHOD OF MAKING WIRE CONNECTIONS
Filed Sept. 24, 1962 3 Sheets-Sheet 1
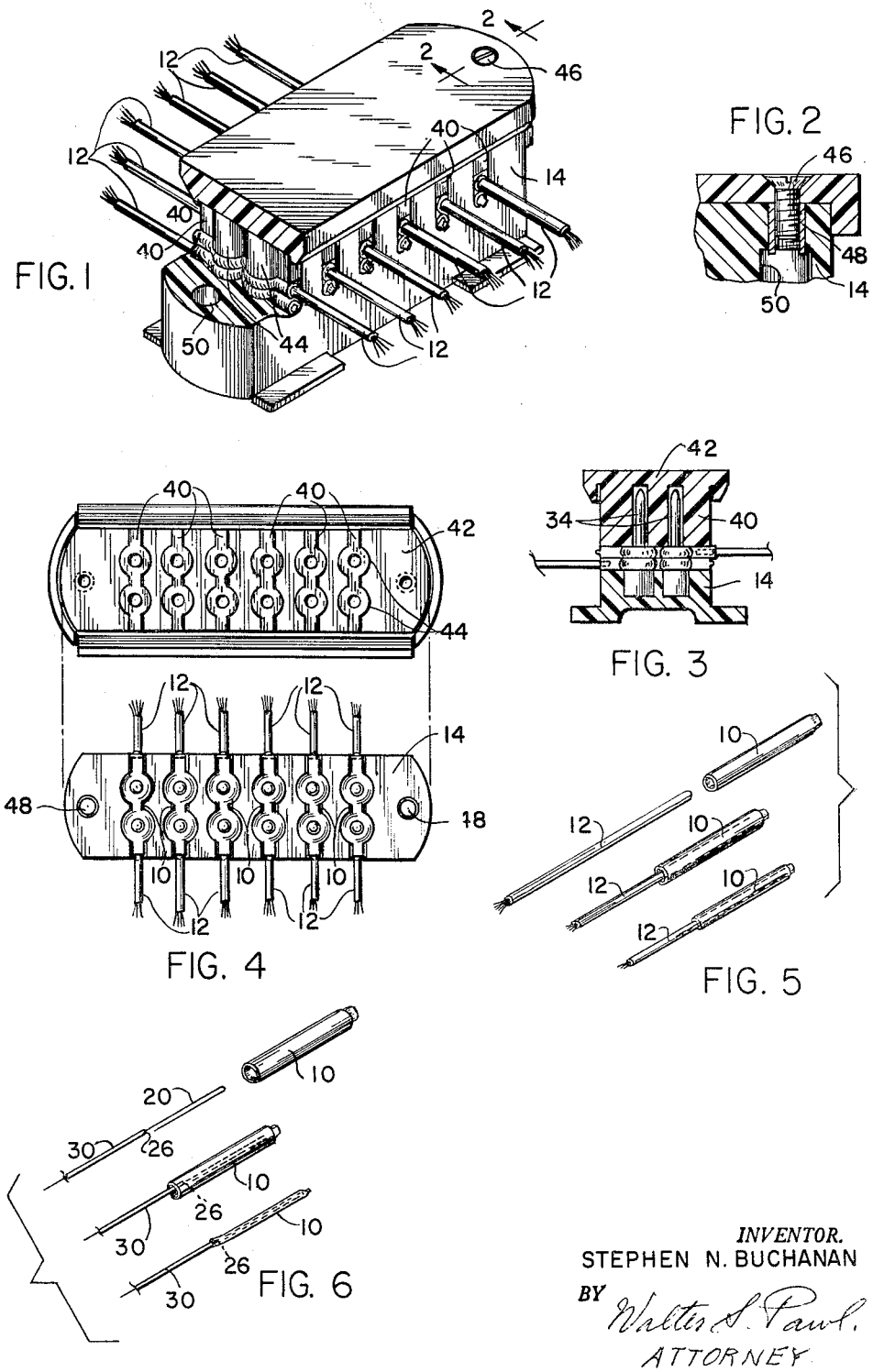
INVENTOR.
STEPHEN N. BUCHANAN
BY
ATTORNEY April 6, 1965 S. N. BUCHANAN 3,177,458
CONNECTOR SYSTEM AND METHOD OF MAKING WIRE CONNECTIONS
Filed Sept. 24, 1962 3 Sheets-Sheet 2

INVENTOR.
STEPHEN N. BUCHANAN
BY Walter S. Paul
ATTORNEY.

April 6, 1965 S. N. BUCHANAN 3,177,458
CONNECTOR SYSTEM AND METHOD OF MAKING WIRE CONNECTIONS
Filed Sept. 24, 1962 3 Sheets-Sheet 3
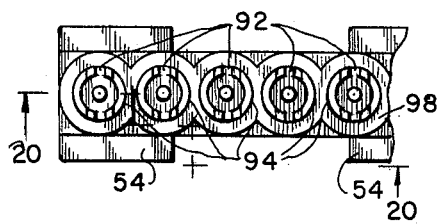
FIG. 19
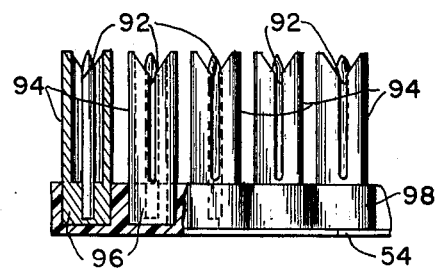
FIG. 20
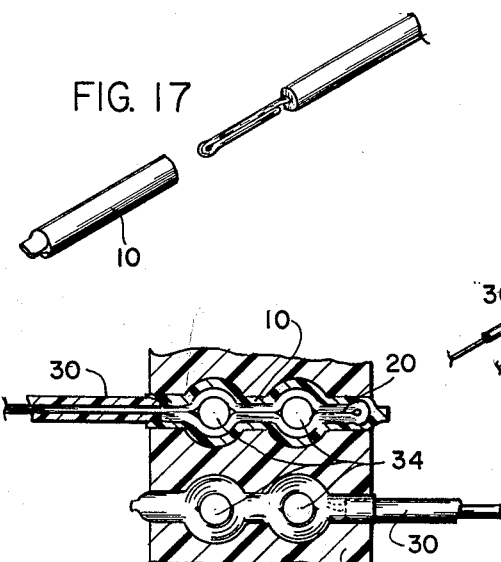
FIG. 17
FIG. 18
FIG. 13
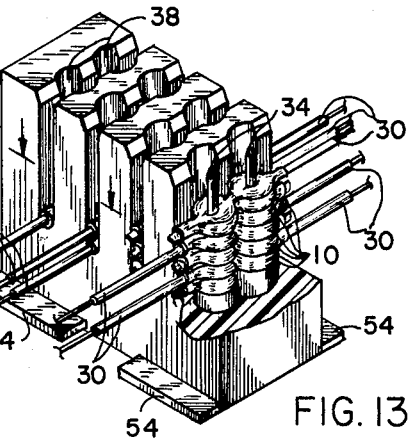
FIG. 15
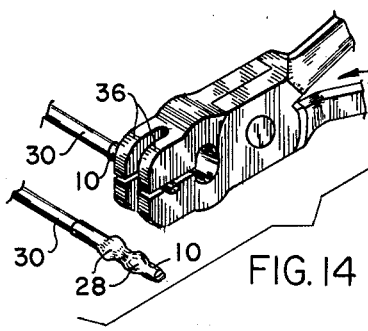
FIG. 14
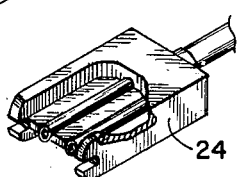
FIG. 16
INVENTOR.
STEPHEN N. BUCHANAN
BY Walter S. Pawl.
ATTORNEY

United States Patent Office 3,177,458
Patented Apr. 6, 1965

3,177,458
CONNECTOR SYSTEM AND METHOD OF MAKING WIRE CONNECTIONS
Stephen N. Buchanan, 5141 Massachusetts Ave. NW., Westmoreland Hills, Md.
Filed Sept. 24, 1962, Ser. No. 225,504
14 Claims. (Cl. 339—99)

This invention relates to new wire connectors and methods of making wire connections.

The object of the present invention is to improve the contact pressure retaining quality of solderless connectors of the unitary rigid type, as well as to increase their resistance to wire pull-out, and to insure their resistance to extreme vibration and shock forces, such as may be encountered in aircraft and rocket wiring systems, particularly in their electronic equipment.

A further object is to use a heat shrinkable insulation sleeve or cap over a wire joint to a connector element, to provide a high contact pressure therebetween, and to retain such pressure indefinitely under extremely adverse conditions.

A further object is to double-over or bend the end of a solid wire on itself, and shrink a sleeve of irradiated modified polyolefin or the like over it by heating, before inserting it into a connector slot or over a connector pin.

A further object is to provide a simple but very reliable and permanent connection between a plurality of wires either directly or through a common connector element by using shrinkable sleeves over the connections to provide contact pressure as well as complete sealing of the conductive parts of the joint.

A further object is to use a cylindrical sleeve connector element with diametrically positioned constant width slots in said sleeve, having flared openings at one end of the sleeve for receiving a plurality of wires of a size greater than said constant width when inserting them into said slots, to provide a high pressure contact between each wire and the common connector sleeve at four points.

A further object is to provide a constant diameter smooth pin axially fixed within the base of said sleeve and having a tapered point extending substantially to the upper end of the sleeve, which has the flared slot openings for engagement with the wires inserted into said slots, to increase their pull-out resistance and provide additional pressure contacts therewith.

A further object is to provide the inserted wire portions with shrunken insulator sleeves before insertion over a pin-type connector or into a slot-type connector, for improving the contact sealing characteristics and, in the pin-type connector, for increasing the contact pressure of the wire against the pin.

A further object is to completely seal wire and terminal connections of the plug-in type by shrinking insulator sleeves over the exposed conductive parts of the wire or terminal, and providing telescoping outer ends on the sleeves for sealing engagement when the male and female plugs are plugged together, to provide a complete seal.

A further object is to shrink the sleeve tightly over the female plug in the plug-in type of connector, to increase its resilient contact pressure and to space the end portion of the sleeve around the male plug terminal from its pin, so that it will snugly sealingly engage the sleeve on said female plug.

A further object is to eliminate the male plug terminal and use the stripped end of the wire itself as the male plug.

A further object is to mount the pin-type or the cylindrical sleeve type or the combination sleeve and pin type connectors in insulator blocks, closely spacing said connectors for compactness.

A further object is to build the insulator blocks around these connectors and to provide guide slots therein in line with the connector slots for receiving and guiding the insulated portions of the inserted wires and preventing breaks or loosening at the contacts resulting from swaying movements of the wires outside the blocks.

A further object is to provide the heat shrinkable insulation sleeves with a lining of suitable sealing material which will provide a water-tight seal around the wires in the joint to which the sleeves are applied.

A further object is to use heat shrinkable sleeves over the wires before insertion in a connector block and closing the outer ends of the sleeves over the ends of the wires to provide a seal against flash over at high altitudes between wire ends in adjacent connectors in the block.

A further object is to use capped shrinkable sleeves over the wire ends for insertion in a connector block for the same purpose.

A further object is to use a pin type block, with capped sleeves on the wire ends inserted over the pins, and an insulated cover block having female plug terminals mounted therein with shrunken sleeves over the exposed plug ends for plugging over the pins in the block so that the sleeve ends are pressed over the sleeves of the uppermost wires on the respective pins to form a complete seal over all conductive parts in the block, said cover block having means for fixing it tightly over said connector block.

A further object is to devise a forming tool for flattening the sleeved wire portions which are to be pierced by the pins to facilitate centering the wires over the pins to guide them so that the pins will pierce between the wire strands of even the smaller sized wires.

Figure 8:
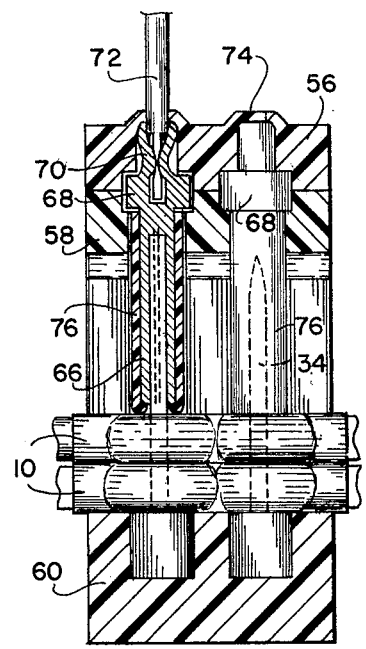
Figures 9, 10, 11:
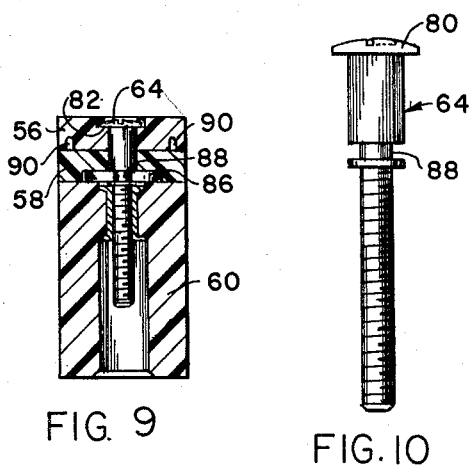
Figure 12:
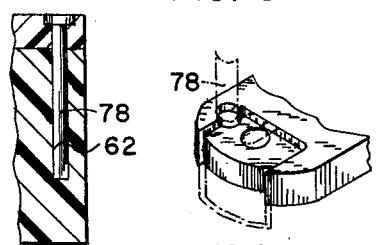

Other and more specific objects will appear in the following detailed description of some preferred forms of the invention, as illustrated in the accompanying drawings, wherein:

FIG. 1 is a perspective view of a six-slotted pin type connector block, partly broken away to show how the conductive parts of the junctures are completely sealed in when the cover is in place, FIG. 2 is a sectional detail view taken on the line 2—2 in FIG. 1, FIG. 3 is a transverse sectional view of the block of FIG. 1, FIG. 4 shows the bottom view of the cover and the top view of the block without the cover, FIG. 5 shows how a heat shrinkable cap is applied to the end of a stranded wire and shrunk thereon for sealing against flash over and to assure a good contact pressure of the wire against a pin on which it may be mounted, FIG. 6 is a similar illustration for solid wire, FIG. 7 is an exploded perspective view of a similar block provided with a cover adapted to receive female plug terminals of wires for connection to one or more of the pins in the block, when the cover is mounted on the block, FIG. 8 is a transverse sectional view of this assembly, showing a wire fixed to one of said plugs, for connection to the corresponding pin, FIG. 9 is a sectional view through one of the ends of the cover and block assembly, showing the mounting bolt, FIG. 10 is an enlarged detail view of one of the mounting bolts, FIG. 11 is a sectional detail view of a guide pin corner of the block and cover, FIG. 12 is a perspective detail bottom view of one end of the cover, FIG. 13 is a perspective view of a four slot block partly broken away to show a plurality of wires connected together in one slot, FIG. 14 is a perspective view of the jaw end of a forming tool to facilitate proper insertion of the wires over the pins, FIG. 15 shows a wire end in the top of a slot ready for insertion, and the head of an inserting tool adapted for pressing the wire into the bottom of the slot, FIG. 16 is a perspective view of the head of the inserting tool, FIG. 17 is an enlarged detail view of a solid wire end stripped and doubled over, ready to receive the shrinkable cap, preparatory to insertion over the pins as a two-stranded completely insulated wire, FIG. 18 is an enlarged detail view of wires of this type, one of them in section, inserted over the connector pins, FIG. 19 is a plan view of a block having cylindrical slotted sleeve connectors with pins, and FIG. 20 is a side elevational view partly in section, showing how these connectors are mounted in the block.

Slotted connector blocks having slotted or pin type conductors adapted for making rigid contact with a plurality of wires in each slot have been disclosed in my pending application S.N. 131,958 filed August 1, 1961. For high altitude operation, a block with one side closed, was used to prevent flashover between the open ends of wires in adjacent slots.

The present invention makes it unnecessary to close one side of the block for high altitude work. A shrinkable closed end sleeve 10 is shrunk over the end of each wire 12 as shown FIG. 5, previous to insertion in the proper slot in the block 14, to seal the exposed end of each wire, so that no closure of one side of the block is necessary, and the wires 12 may extend to either side of the block.

Tubing of irradiated modified polyolefin and the like has been found suitable for the sleeve material. It shrinks as much as 60% in inside diameter when heated at 250°– 300° for 2½ to 3 seconds and forms a tough stable semirigid skin, stretched tightly over any contour over which it has been shrunk, which is larger than its shrunken peripheral dimensions. This characteristic makes it invaluable as a means for sealing around the contacts of the wire with the connector, but also in providing an ample contact pressure of the wire against a pin connector over which the wire may be impaled, independent of any such pressure that may be provided by the sides of the slot in which the pin connector is located. Thus the range of sizes of wires accommodated by one size of slot may be considerably extended without sacrificing good contact pressures for the smaller size wires.

The use of these shrinkable sleeves also makes feasible the connection of solid wires 30 in the pin type connector blocks. This is done by stripping the end 20 of a solid wire 30 and bending it over as shown in FIG. 6 or 17 to form a two-strand wire, which is then capped by the closed end sleeve 10, and the sleeve heated to shrink it around the wire strands and over the end of the wire insulation 26.

The wire is then flattened at two places 28 by the forming tool 32 which has two pairs of jaws 36 spaced the same as the pins 34 in the connector slot, which is equivalent to substantially half the pitch of the standard twist in stranded wires, as brought out in my pending application.

The flattened portions 28 of the wire position the wire strands in the horizontal plane, and fit into the enlarged portions 38 of the slot around the pins 34 to guide the wire centrally over the pins so that they will pierce between the wire strands, and the sleeve 10 will press the strands at concentrated points against the opposite sides of the pins, after the inserting tool head 24 has pushed the wire down into the slot.

The cover 42 has filler lugs 40 with bulges 44 extending downwardly into the slots and around the pins, for the purpose of pressing firmly against the top of the uppermost wire in each slot, and thus provides a complete seal of all conductor parts against outside moisture and oxidation in air and against flashover in space. The fastening means may be a low pitch threaded screw 46 for holding down each end of the cover by screwing into a threaded sleeve 48 fixed in the bore 50 in the block. This makes the device absolutely vibration and shock proof, and the electrical contacts remain permanently as good as a continuous wire connection between the wires in each slot, in spite of any extreme weather and vibrational environments.

The block 52 shown in FIG. 13 is similar to block 14 but has only four connector slots. With the four and six slot blocks, a combination of any number of slots varying by increments of two slots may be made up, by mounting the required number of each size of blocks, end to end, in a common side-grooved mounting strip, by sliding the base flanges 54 of the blocks into the side-grooves of a mounting strip of suitable length. The smallest combination would be composed of one four slot block; next, one six slot block; then, two fours; one four and one six; two sixes, etc., as may be required.

While the four slot block 52 is shown only with solid wires and block 14 only with stranded wires, the slots are the same in both blocks and either type of wire or a mixture of wires can be used in any block in any mixed sizes within a wide range, by applying thicker sleeves on the smaller size wires to provide a relatively snug fit in the guide slots opening at the sides of the blocks, so as to prevent working of the contacts by wire swaying outside the blocks. The application of the sleeves also strengthens the emerging wires against sharp bends when pulled to one side or the other of the slots, which would tend to reduce breakage at these points due to continuous oscillations of the wires.

In many normal uses, the cover 46 may not be necessary, where vibration is not a problem, and where frequent changes in the hook-ups is required. The open ends of the pins 34 may then be used as male plugs for individual female plug wire terminals for tapping into any connection in the block for test purposes of branch circuits, etc.

FIGS. 7 to 12 show a cover block composed of two parts 56 and 58 clamped together and provided with sockets therebetween in which a plurality of such female plug terminals may be held for mounting simultaneously over any number of the pins in the block 60 which may be identical to block 14, so that the assembly of female plugs may be used interchangeably on block 60 or block 14, by providing the same guide bores 62 in each block, and the same screw sleeves 48, so that the mounting bolts 64 may be used with either block, and covers 42 may likewise be used with either block.

The female plug terminals have a split tubular plug end 66, an enlarged shoulder portion 68 for loosely mounting in the socket formed between the block posts 56 and 58, and a tubular crimping end 70 for receiving the stripped end of a wire 72 to be crimped therein after passing through the corresponding opening in the upper or outer part 56 of the two part cover. These openings may be normally closed by knockout plugs 74, and opened only when a wire is to be connected to female plug terminal in the corresponding socket.

The split tubular plug end 66 of each female plug terminal may be covered with a shrunken sleeve 76 stretched over it and extending outwardly beyond the end of the plug end 66, so as to form a complete seal around the pins 34 against the uppermost wire in each slot when the plug assembly is tightened down over the block 60 by means of the captive bolts 64. When the cover block is assembled with the desired wires 72 crimped to their respective plug terminals, the two parts 56 and 58 are brought together with the guide pins 90 in their corresponding guide holes, the bolts 64 pushed through their bores until their heads 80 rest on the countersunk shoulders 82. The end clips 84 are then pushed into place by slipping their forked bases 86 into the grooves 88 around the shanks of the bolts to lock the parts 56 and 58 together while the guide pins 78 are inserted into the guide holes 62 in the block 60 and the bolts 64 are started in the screw sleeves 48, and the female plugs are all started over their corresponding pins 34. The bolts 64 are then screwed down until the cover block is pulled down tight on top of the block 60, and the end of each sleeve on the female plugs is sealed against the uppermost wire in its corresponding slot, as may be seen in FIG. 8.

FIGS. 19 and 20 show a modification comprising connector elements which are a combination of the rigid slot and pin type conductor elements, the constant width slots 92 being formed in a cylindrical sleeve 94 of rigid conductive material having a solid base 96 at the bottom of the slots, which is firmly fixed in a plastic insulation block 98. The block may be provided with base flanges 54 dimensioned like the base flanges of the other blocks, for mounting in standard mounting strips with the other types of blocks 14 and 60. The pins 100 are made integral with the solid bases 96 or may be fixed firmly therein to form a unitary rigid combination pin and slot conductor element for receiving a wide range of wire types and sizes.

The same techniques of shrinking sleeves over the wires may be used with these connectors for the purpose of making well sealed contact joints against corrosion and oxidation. The slots 92 may be made narrower than the thickness of the bare wire to be installed, in which case the cylindrical elements provide additional contacts with the wire which would be sufficient without the pin contacts, and for some purposes it may be desirable to omit the pins. On the other hand, slots 92 may be made wider and may be used merely as guide slots for the insulated portion of the wire adjacent the pin contacts, to prevent working of the wire at these contacts which may otherwise be caused by swaying of the wires about the joint. The wires may be used without the shrunken sleeves for normal use, but where adverse conditions are to be met, it will be advantageous to use the sleeves to strengthen the wire against sharp bending stresses and loosening at the contacts. Also for more complete sealing against moisture, corrosion or oxidation of the contacts, it is advisable to use the shrunken sleeves, which, due to their memory characteristic, tend to shrink around the joints more closely against the adjacent surfaces, to form a tight seal all around the joint as well as around the wire insulation.

For some purposes, it may be desirable to build the insulation material of the block around the cylindrical elements aligned with the slots 92. A top or cover similar to cover 42 could then be used where a complete seal against flashover at high altitude or in outer space is required. Also a sealed female plug cover assembly like that shown in FIGS. 7 to 12 in connection with the block 60, could be used for similar purposes.

The shrunken sleeves also add to the wire pull-out resistance, although it was found that even without these sleeves, it was not possible to pull the wires out, and the wire broke outside the joint without harm to the connection.

This system of wire connection has proven to be electrically and mechanically as good or better than a continuous wire at the joint, and the sealing against moisture and corrosion, oxidation and flashover can be made substantially as good or better by the use of suitable covers and closed end shrinkable sleeves over the ends of the wires.

The shrinkable sleeve may also be used for insulating and at the same time ensuring a good pressure contact in a splice joint between two or more stripped wires.

An extremely good water-proof seal is obtained by using a shrinkable sleeve internally lined with a suitable coating of sealing material, which will fill all crevices around the joint and the end of the wire insulation which the sleeve overlaps, during the application of heat required to shrink the sleeve material.

The heat shrinkable sleeve material was found to be stable after shrinking and acquired a tough leatherlike semi-rigid quality, not effected by heat or cold, such as being inserted in boiling water, heating in a frying pan to over 500° F., or keeping it overnight in a freezer. Nor was it found effected by soaking under water overnight.

Many obvious modifications in the technique and the details of this new wire connector system may be made without departing from the spirit and scope of the present invention, as defined in the appended claims.

What is claimed is:

1. An electrical connection, comprising a connector block of insulating material and having a plurality of connector elements, each connector element comprising a substantially constant diameter pin of conductive material having a base end mounted in said block and a tapered free end tapering to a point, and a wire in engagement with at least one of said pins, said wire having a closed end sleeve thereon of heat shrinkable material which has been heat shrunk to engage tightly around the wire, said pin extending transversely through the sleeve on the wire and being in electrical contact with the wire, the sleeve holding the wire in tight engagement with the pin for forming a good electrical and mechanical connection.

2. An electrical connection, comprising a connector block of insulating material having a plurality of slots extending transversely through the block and opening out of the top of the block, a plurality of connector elements in said block, each comprising a substantially constant diameter pin of conductive material having a base end mounted in said block in the bottom of a slot and a tapered free end tapering to a point in the slot, there being at least one pin in each slot, and a wire extending into at least one of the slots in said block laterally of the block and in engagement with at least one pin in said slot, said wire having a closed end sleeve thereon of heat shrinkable material which has been heat shrunk to engage tightly around the wire, said pin extending transversely through the sleeve on the wire and being in electrical contact with the wire, the sleeve holding the wire in tight engagement with the pin for forming a good electrical and mechanical connection.

3. An electrical connection as claimed in claim 2 in which there are two pins in each slot and said sleeve has each pin extending through it and each pin is in contact with the wire onto which the sleeve is shrunk, the end of the wire lying adjacent the end of the slot.

4. An electrical connection as claimed in claim 3 in which the wire is a stranded wire and the pins pass through the wire between and in contact with the strands thereof.

5. An electrical connection as claimed in claim 4 in which the portions of the wires through which the pins extend are flattened.

6. An electrical connection as claimed in claim 4 in which the wire is a twisted stranded wire and the portions of the wire through which the pins extend are flattened, the flattened portions of the wire and the pins being spaced a distance equal to one-half the pitch of the twist of the wire strands, whereby the strands of the wire pass first on one side of one pin and then on the opposite side of the other pin.

7. An electrical connection as claimed in claim 2 in which there are a plurality of wires extending into at least one slot in said insulating block, each having the sleeve of heat shrinkable material thereon heat shrunk to engage tightly around the wire, and the pins passing through the sleeves on each of the wires in a slot and in electrical engagement with each wire.

8. An electrical connection as claimed in claim 7 in which the wires extend into the slots from opposite sides of the insulating block.

9. An electrical connection as claimed in claim 2 in which each slot in said insulating block has a plurality of cylindrical portions therein, and there are a plurality of pins in each slot, one centered in each cylindrical portion and extending substantially axially of the cylindrical portion, the diameter of the sleeve after it is shrunk onto the wire being slightly greater than the minimum width of the slot, whereby the sides of the slot act to further press the wire in tight electrical and mechanical engagement with the pin.

10. An electrical connection as claimed in claim 9 in which the ends of the slots opening out of the top of the block are flared outwardly for facilitating the introduction of the sleeves and wires into the slot.

11. An electrical connection as claimed in claim 2 in which said wire is a solid wire bent back on iteslf, and said sleeve is shrunk over the parallel parts of the bent back wire, the pin extending between the parallel parts of the bent back wire and having the parts of the wire held against opposite sides of the pin by the shrunk sleeve.

12. An electrical connection as claimed in claim 2 and a cover member for said insulating block, said cover member comprising a cover plate and a plurality of depending portions each having a shape complementary to the shape of the slots in said insulating block and each having a number of bores therein corresponding to the number of pins in the slots, said bores receiving the portions of the pins which extend past the sleeves of the wires, and means coupled between said cover member and said insulating block for drawing said cover member down into engagement with the top of the insulating block.

13. An electrical connection as claimed in claim 2 and a female plug cover member for said insulating block, said member comprising a cover plate having a plurality of apertures therein, a socket holding plate secured to said cover plate and having a plurality of apertures therein aligned with the apertures in said cover plate, at least one of said plates having recesses around said apertures in the surface facing the other plate, female plug elements each comprising a tubular socket of conducting material projecting downwardly through the socket holding plate and electrically engaging around a pin and having an enlargement on the end thereof engaged in the recess between the two plates, means on the end thereof toward the cover plate adapted to engage a conductor, and a sleeve of insulating material shrunk over the outside of said tubular socket projecting downwardly from the socket holding plate and engageable in the slot of said insulating block, and means coupled between said cover member and said insulating block for drawing said cover member down into engagement with the top of the insulating block.

14. An electrical connection, comprising a connector block of insulating material, a plurality of connector elements in said block, each comprising a substantially constant diameter pin of conductive material having a base end mounted in said block and a tapered free end tapering to a point, a cylindrical sleeve of conductive material mounted in said connector block concentric with each pin, said sleeves each having diametrally opposed slots therein, and a wire extending into at least one of the sleeves through a slot therein laterally of the sleeve and in engagement with the pin in said sleeve, said wire having a closed end sleeve thereon of heat shrinkable material which has been heat shrunk to engage tightly around the wire, said pin extending transversely through the sleeve on the wire and being in electrical contact with the wire in the sleeve, the sleeve holding the wire in tight engagement with the pin for forming a good electrical and mechanical connection.

References Cited in the file of this patent

UNITED STATES PATENTS

| | | |
|---|---|---|
| 2,267,449 | Eby | Dec. 23, 1941 |
| 2,419,683 | Henschke | Apr. 29, 1947 |
| 2,725,823 | Henschke | Dec. 6, 1955 |
| 2,729,695 | Pierce | Jan. 3, 1956 |
| 2,751,568 | Despard | June 19, 1956 |
| 2,786,095 | Arbeiter | Mar. 19, 1957 |
| 3,016,512 | Borchard | Jan. 9, 1962 |
| 3,035,113 | Danchuk | May 15, 1962 |
| 3,064,072 | Graff et al. | Nov. 13, 1962 |

FOREIGN PATENTS

| | | |
|---|---|---|
| 883,155 | Great Britain | Nov. 22, 1961 |